(12) United States Patent
Moghe et al.

(10) Patent No.: US 7,673,147 B2
(45) Date of Patent: *Mar. 2, 2010

(54) REAL-TIME MITIGATION OF DATA ACCESS INSIDER INTRUSIONS

(75) Inventors: Pratyush Moghe, Stow, MA (US); Peter T. Smith, Mansfield, MA (US)

(73) Assignee: Tizor Systems, Inc., Maynard, MA (US)

( * ) Notice: Subject to any disclaimer, the term of this patent is extended or adjusted under 35 U.S.C. 154(b) by 1439 days.

This patent is subject to a terminal disclaimer.

(21) Appl. No.: 10/950,069

(22) Filed: Sep. 24, 2004

(65) Prior Publication Data

US 2005/0071642 A1    Mar. 31, 2005

Related U.S. Application Data

(60) Provisional application No. 60/506,053, filed on Sep. 26, 2003.

(51) Int. Cl.
    *H04K 1/00*    (2006.01)

(52) U.S. Cl. ............................ 713/182; 726/1; 726/2; 726/3

(58) Field of Classification Search .............. 713/1, 713/2, 188, 194, 182; 380/200, 201, 255, 380/277; 726/1–4, 22–23, 26–30
See application file for complete search history.

(56) References Cited

U.S. PATENT DOCUMENTS

| | | | | |
|---|---|---|---|---|
| 6,275,941 | B1 * | 8/2001 | Saito et al. | 726/2 |
| 6,339,830 | B1 * | 1/2002 | See et al. | 726/15 |
| 7,035,223 | B1 * | 4/2006 | Burchfiel et al. | 370/248 |
| 7,246,370 | B2 * | 7/2007 | Valente et al. | 726/1 |
| 2003/0005326 | A1 * | 1/2003 | Flemming | 713/201 |

* cited by examiner

*Primary Examiner*—Beemnet W. Dada
*Assistant Examiner*—Joseph Pan
(74) *Attorney, Agent, or Firm*—David H. Judson

(57) ABSTRACT

The present invention provides a policy specification framework to enable an enterprise to specify a given insider attack using a holistic view of a given data access, as well as the means to specify and implement one or more intrusion mitigation methods in response to the detection of such an attack. The policy specification provides for the use of "anomaly" and "signature" attributes that capture sophisticated behavioral characteristics of illegitimate data access. When the attack occurs, a previously-defined administrator (or system-defined) mitigation response (e.g., verification, disconnect, de-provision, network re-routing, or the like) is then implemented.

12 Claims, 5 Drawing Sheets

TCP SESSION TERMINATION

USER ACCOUNT DE-PROVISION

REAL-TIME MITIGATION OF DATA ACCESS INSIDER INTRUSIONS

CROSS-REFERENCE TO RELATED APPLICATIONS

This application is based on and claims priority from Ser. No. 60/506,053, titled "Real-time Mitigation of Data Access Insider Intrusions," filed Sep. 26, 2003.

This application also is related to Ser. No. 10/780,252 titled "A Method and Apparatus to Detect Unauthorized Information Disclosure via Content Anomaly Detection" filed Feb. 17, 2004.

COPYRIGHT STATEMENT

This application includes subject matter that is protected by copyright. All rights are reserved.

BACKGROUND OF THE INVENTION

1. Technical Field

The present invention relates generally to real-time monitoring, auditing and protection of information assets in enterprise repositories such as databases, file servers, web servers and application servers.

2. Description of the Related Art

"Insider" intrusions are damaging to enterprises and cause significant corporate risk of different forms including: brand risk, corporate trade secret disclosure risk, financial risk, legal compliance risk, and operational and productivity risk. Indeed, even the specification of an insider intrusion creates challenges distinct from external intrusions, primarily because such persons have been authenticated and authorized to access the devices or systems they are attacking. Industry analysts have estimated that insider intrusions cost over $2.7 million per incident and in many cases are significantly more damaging than external intrusions by unauthorized users. As such, it is critical that if an insider intrusion is detected, the appropriate authorities must be alerted in real-time and the severity of the attack meaningfully conveyed. Additionally, because users who have complete access to the system carry out insider intrusions, it is important to have a mitigation plan that can inhibit further access once an intrusion is positively identified.

Classically, intrusion detection has been approached by classifying misuse (via attack signatures), or via anomaly detection. Various techniques used for anomaly detection include systems that monitor packet-level content and analyze such content against strings using logic-based or rule-based approaches. A classical statistical anomaly detection system that addressed network and system-level intrusion detection was an expert system known as IDES/NIDES. In general, statistical techniques overcome the problems with the declarative problem logic or rule-based anomaly detection techniques. Traditional use of anomaly detection of accesses is based on comparing sequence of accesses to historical learned sequences. Significant deviations in similarity from normal learned sequences can be classified as anomalies. Typical similarity measures are based on threshold-based comparators or non-parametric clustering classification techniques such as Hidden Markov models. While these known techniques have proven useful, content-based anomaly detection presents a unique challenge in that the content set itself can change with time, thus reducing the effectiveness of such similarity-based learning approaches.

It is also known that so-called policy languages have been used to specify FCAPS (fault-management, configuration, accounting, performance, and security) in network managements systems. For example, within the security arena, policy languages sometimes are used to specify external intrusion problems. These techniques, however, have not been adapted for use in specifying, monitoring, detecting and ameliorating insider intrusions.

In typical access management, it is also known that simple binary matching constructs have been used to characterize authorized versus unauthorized data access (e.g., "yes" if an access request is accompanied by the presence of credentials and "no" in their absence). In contrast, and as noted above, insider intrusions present much more difficult challenges because, unlike external intrusions where just packet-level content may be sufficient to detect an intrusion, an insider intrusion may not be discoverable absent a more holistic view of a particular data access. Thus, for example, generally it can be assumed that an insider has been authenticated and authorized to access the devices and systems he or she is attacking; thus, unless the behavioral characteristics of illegitimate data accesses can be appropriately specified and behavior monitored, an enterprise may have no knowledge of the intrusion let alone an appropriate means to address it.

Thus, there remains a long felt need to provide real-time monitoring, auditing and protection of information assets against attack from enterprise insiders.

BRIEF SUMMARY OF THE INVENTION

It is a general object of the invention to provide an enterprise with techniques to specify an insider attack signature, to automatically monitor for such an attack, and to take appropriate steps to mitigate damage when the attack is detected.

It is a more specific object of the invention to provide an enterprise administrator with the ability to describe disclosure-, integrity- and availability-related attacks on enterprise data repositories that may be expected to be carried out by trusted persons or other entities operating on their behalf so that monitoring and mitigation tools can protect such information assets. In an illustrative embodiment, a policy specification framework enables an administrator to describe a given insider attack easily and succinctly through a simple declarative grammar, preferably using a graphical user interface menu. The declarative grammar comprises a flexible combination of constructs that can specify simple (default) or complex insider attack definitions. After a given insider attack has been defined as a "policy," the system monitors access behavior (with respect to a given network, system, machine, device, program or process) against that policy and issues an "alert" when the policy is triggered.

It is another more specific object of the invention to respond to such an "alert" using one or more mitigation methods. In an illustrative embodiment, when an administrator specifies a given insider attack policy, he or she may also specify one or more mitigation methods to be carried out in the event of the attack. Thus, the invention contemplates a suite of one or more mitigation methods depending on the severity of the insider intrusion.

In an illustrative embodiment, the suite of mitigation methods provide powerful insider intrusion prevention. These methods include, by way of example only: user interrogation, user disconnect, and user privilege de-provisioning. In a first mitigation method, the system provides for direct or indirect user interrogation and/or validation. This technique is particularly useful, for example, when users from suspicious locations initiate intrusions and validation can ascertain if they are legitimate. If an insider intrusion is positively verified, the system then can perform a user disconnect, such as a network-level connection termination. One particular method of the user disconnect implementation involves network level TCP session termination, which causes the session to be dropped by the client or server, or both. If additional protection is required, a further mitigation technique then "de-provisions" the user. Thus, for example, if an insider intrusion is positively verified, the system can directly or indirectly modify the authorization information within centralized authorization databases or directly modify application authorization information to perform de-provisioning of user privileges. De-provisioning of user privileges may be local (i.e., affecting only the system under attack), or it may have a global scope beyond that of the immediate application, thus preventing the intruding user from accessing corporate resources until, for example, administrative intervention has occurred. The above-described mitigation policies may be implemented independently of one another.

Thus, the present invention provides a policy specification framework to enable an enterprise to specify a given insider attack using a holistic view of the data access, as well as the means to specify and implement one or more intrusion mitigation methods in response to the detection of such an attack. The policy specification provides for the use of "anomaly" and "signature" attributes that capture sophisticated behavioral characteristics of illegitimate data access. Advantageously, these attributes capture temporal and relative changes in the properties of data access. For instance, the enterprise may specify that an anomaly attribute called "large" be evaluated on a data access property called "size" to capture large data retrieval—perhaps indicative of a bulk data theft. When the attack occurs, a previously-defined administrator (or system-defined) mitigation response (e.g., verification, disconnect, de-provision, quarantine or the like) is then implemented.

The foregoing has outlined some of the more pertinent features of the invention. These features should be construed to be merely illustrative. Many other beneficial results can be attained by applying the disclosed invention in a different manner or by modifying the invention as will be described.

DETAILED DESCRIPTION OF AN EMBODIMENT

Figure 1:
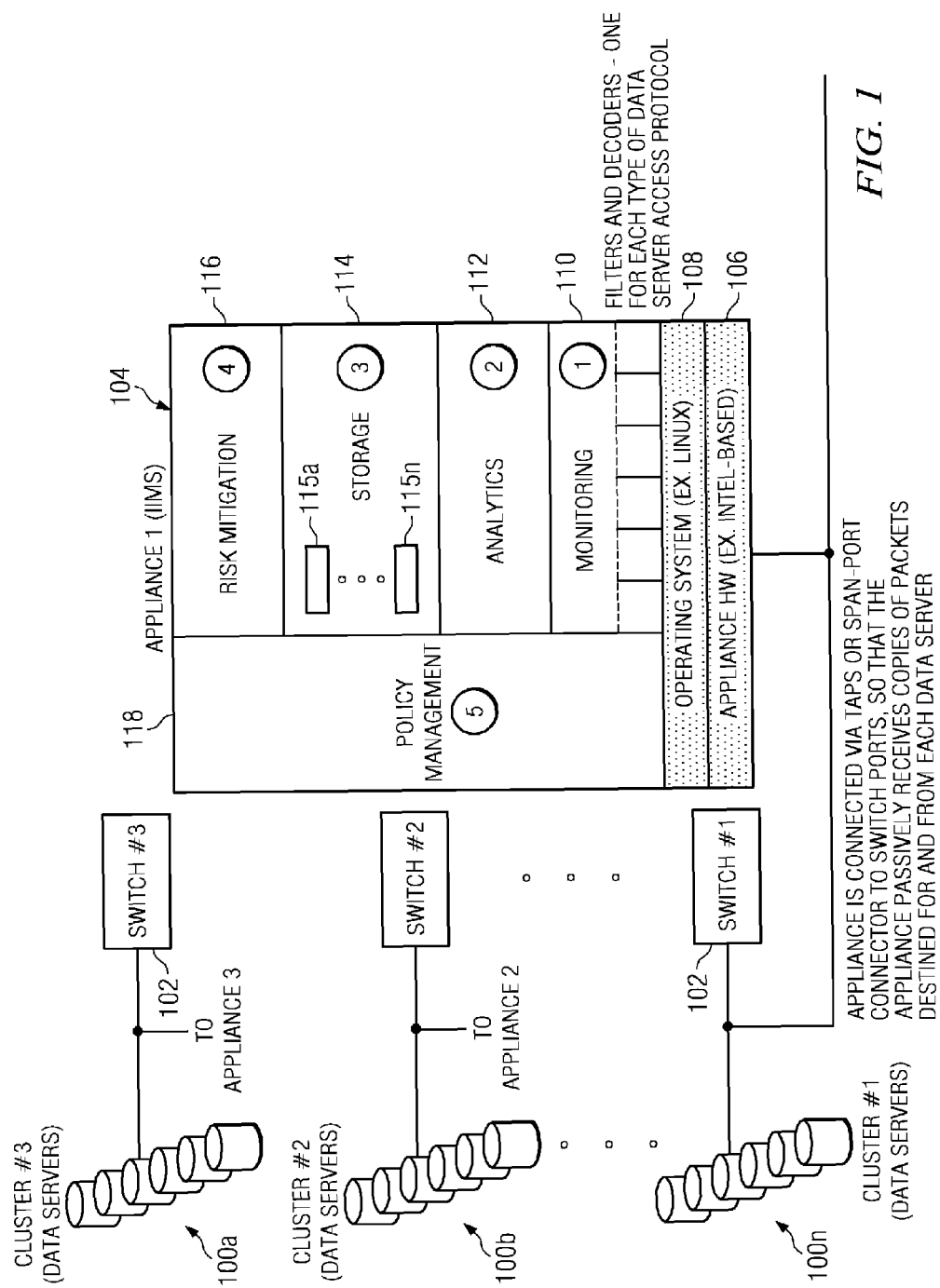
FIG. 1 illustrates a representative enterprise computing environment and a representative placement of a network-based appliance that facilitates the information auditing and protection functions of the present invention

As used herein, an "insider" is an enterprise employee, agent, consultant or other person (whether a human being or an automated entity operating on behalf of such a person) who is authorized by the enterprise to access a given network, system, machine, device, program, process, or the like, and/or one such entity who has broken through or otherwise compromised an enterprise's perimeter defenses and is posing as an insider. More generally, an "insider" can be thought of a person or entity (or an automated routine executing on their behalf) that is "trusted" (or otherwise gains trust, even illegitimately) within the enterprise. An "enterprise" should be broadly construed to include any entity, typically a corporation or other such business entity, that operates within a given location or across multiple facilities, even worldwide. Typically, an enterprise in which the present invention is implemented operates a distributed computing environment that includes a set of computing-related entities (systems, machines, servers, processes, programs, libraries, functions, or the like) that facilitate information asset storage, delivery and use. One such environment is illustrated in FIG. 1 and includes one or more clusters 100a-n of data servers connected to one or more switches 102a-n. Although not meant to be limiting, a given data server is a database, a file server, an application server, or the like, as the present invention is designed to be compatible with any enterprise system, machine, device or other entity from which a given data access can be carried out. A given cluster 100 is connected to the remainder of the distributed environment through a given switch 102, although this is not a limitation of the enterprise environment. In this illustrative embodiment, the present invention is implemented by a network-based appliance 104 that preferably sits between a given switch 102 and a given cluster 100 to provide real-time monitoring, auditing and protection of information assets in the cluster.

As also illustrated in FIG. 1, the appliance 104 is a machine running commodity (e.g., Pentium-class) hardware 106, an operating system (e.g., Linux, Windows 2000 or XP, OS-X, or the like) 108, and having a set of functional modules: a monitoring module or layer 110, an analytics module or layer 112, a storage module or layer 114, a risk mitigation module or layer 116, and a policy management module or layer 118. These modules preferably are implemented a set of applications or processes (e.g., linkable libraries, native code, or the like, depending on platform) that provide the functionality described below. More generally, unless indicated otherwise, all functions described herein may be performed in either hardware or software, or any combination thereof. In an illustrated embodiment, the functions are performed by one or more processors executing given software. The functions of the various modules as described below may be implemented in fewer than the modules disclosed or in an integrated manner, or through a central management console. Although not illustrated in detail, typically the appliance 104 also includes an application runtime environment (e.g., Java), a browser or other rendering engine, input/output devices and network connectivity. The appliance 104 may be implemented to function as a standalone product, to work cooperatively with other such appliances while centrally managed or configured within the enterprise, or to be managed remotely, perhaps as a managed service offering.

In the illustrated embodiment, the network appliance monitors the traffic between a given switch and a given cluster to determine whether a given administrator- (or system-) defined insider attack has occurred. As used herein, the phrases "insider intrusions," "access intrusion," "disclosure violations," "illegitimate access" and the like are used interchangeably to describe any and all disclosure-, integrity- and availability-related attacks on data repositories carried out by trusted roles. As is well-known, such attacks can result in unauthorized or illegitimate disclosures, or in the compromise of data integrity, or in denial of service. As already noted, the nature and type of data repositories that can be protected by the appliance include a wide variety of devices and systems including databases and database servers, file servers, web servers, application servers, other document servers, and the like (collectively, "enterprise data servers" or "data servers"). This definition also includes directories, such as LDAP directories, which are often used to store sensitive information.

Figure 2:
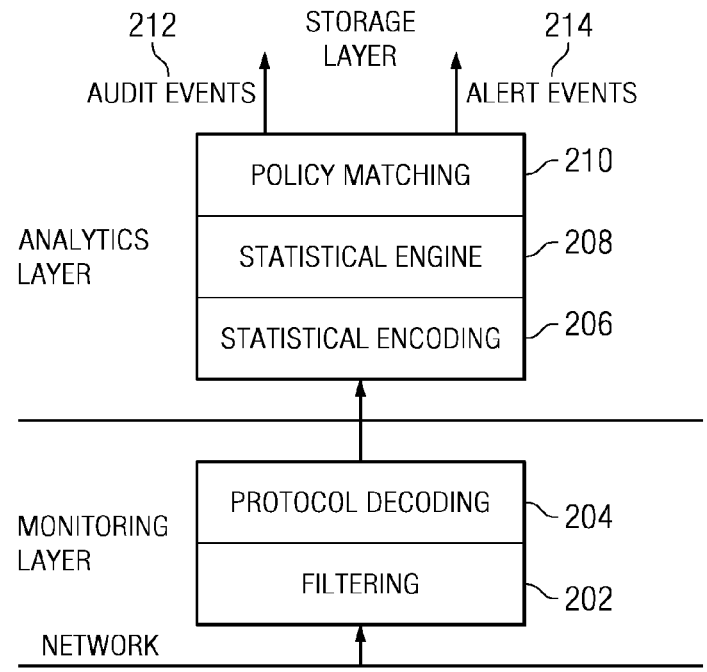
FIG. 2 is a block diagram illustrating the Monitoring and Analytics layers of the present invention.

Referring now back to FIG. 1, the first module 110 (called the monitoring layer) preferably comprises a protocol decoding layer that operates promiscuously. The protocol decoding layer typically has specific filters and decoders for each type of transactional data server whether the data server is a database of a specific vendor (e.g., Oracle versus Microsoft SQL Server) or a file server or an application server. In general, the protocol decoding layer filters and decoders extend to any type of data server to provide a universal "plug-n-play" data server support. The operation of the layer preferably follows a two-step process as illustrated in FIG. 2: filtering and decoding. In particular, a filtering layer 202 first filters network traffic, e.g., based on network-, transport-, and session-level information specific to each type of data server. For instance, in the case of an Oracle database, the filter is intelligent enough to understand session-level connection of the database server and to do session-level de-multiplexing for all queries by a single user (client) to the user. In this example, only network traffic that is destined for a specific data server is filtered through the layer, while the remaining traffic is discarded. The output of the filtering preferably is a set of data that describes the information exchange of a session along with the user identity. The second function of the monitoring layer is to decode the (for example) session-level information contained in the data server access messages. In this function 204, the monitoring layer parses the particular access protocol, for example, to identify key access commands of access. Continuing with the above example, with Oracle data servers that use SQLNet or Net8 as the access protocol, the protocol decoding layer is able to decode this protocol and identity key operations (e.g., SELECT foo from bar) between the database client and server. This function may also incorporate specific actions to be taken in the event session-level information is fragmented across multiple packets. The output of function 204 is the set of access commands intended on the specific data server.

The monitoring layer may act in other than a promiscuous mode of operation. Thus, for example, given traffic to or from a given enterprise data server may be encrypted or otherwise protected. In such case, it may be desirable to include in the monitoring layer additional code (e.g., an agent) that can be provisioned to receive and process (through the filtering and decoding steps) data feeds from other sources, such as an externally-generated log.

The monitoring layer advantageously understands the semantics of the one or more data access protocols that are used by the protected enterprise data servers. As will be described in more detail below, the policy management layer 118 implements a policy specification language that is extremely flexible in that it can support the provisioning of the inventive technique across many different kinds of data servers, including data servers that use different access protocols. Thus, for example, the policy language enables the administrator to provision policy filters (as will described) that process functionally similar operations (e.g., a "READ" Operation with respect to a file server and a "SELECT" Operation with respect to a SQL database server) even though the operations rely on different access protocols. Because the policy management layer 118 supports this flexibility, the monitoring layer 110 must likewise have the capability to understand the semantics of multiple different types of underlying data access protocols. In addition, the monitoring layer can monitor not only for content patterns, but it can also monitor for more sophisticated data constructs that are referred to herein (and as defined by the policy language) as "containers." "Containers" typically refer to addresses where information assets are stored, such as table/column containers in a database, or file/folder containers in a file server. Content "patterns" refer to specific information strings. By permitting use of both these constructs, the policy language provides significant advantages, e.g., the efficient construction of compliance regulations with the fewest possible rules. Moreover, because the monitoring layer 118 understands the semantics of the underlying data access protocols (in other words, the context of the traffic being monitored), it can enforce (or facilitate the enforcement of) such policy.

The second module 112 (called the analytics layer) implements a set of functions that match the access commands to attack policies defined by the policy management layer 118 and, in response, to generate events, typically audit events and alert events. An alert event is mitigated by one or more techniques under the control of the mitigation layer 116, as will be described in more detail below. The analytics are sometimes collectively referred to as "behavioral fingerprinting," which is a shorthand reference that pertains collectively to the algorithms that characterize the behavior of a user's information access and determine any significant deviations from it to infer theft or other proscribed activities. The following description outlines the sequential implementation of this functionality by way of example. Further details of this layer are described in Ser. No. 10/780,250, which is incorporated herein by reference.

With reference to FIG. 2, a statistical encoding function 206 translates each access operative into a compact, reversible representation. As will be described in more detail below, this representation is guided by a compact and powerful (preferably English-based) policy language grammar. This grammar comprises a set of constructs and syntactical elements that an administrator may use to define (via a simple GUI menu) a given insider attack against which a defense is desired to be mounted. In an illustrative embodiment, the grammar comprises a set of data access properties or "dimensions," a set of one or more behavioral attributes, a set of comparison operators, and a set of expressions. A given dimension typically specifies a given data access property such as (for example): "Location," "Time," "Content," "Operation," "Size," "Access" or "User." A given dimension may also include a given sub-dimension, such as Location-.Hostname, Time.Hour, Content.Table, Operation.Select, Access.Failure, User.Name, and the like. A behavioral attribute as used herein typically is a mathematical function that is evaluated on a dimension of a specific data access and returns a TRUE or FALSE indication as a result of that evaluation. A convenient set of behavior attributes thus may include (for example): "Rare," "New," "Large," High Frequency" or "Unusual," with each being defined by a given mathematical function. The grammar may then define a given "attribute (dimension)" such as Large (Size) or Rare (Content.Table), which construct is then useful in a given policy filter. For additional flexibility, the grammar may also include comparison operators to enable the administrator to define specific patterns or conditions against which to test, such as Content.Table is "Finance" or Time.Hour=20. Logical operators, such as AND, OR and the like, can then be used to build more complex attack expressions as will seen below.

A given attack expression developed using the policy management layer is sometimes referred to as a policy filter. As seen in FIG. 2, the analytics layer preferably also includes a statistical engine 208 that develops an updated statistical distribution of given accesses to a given data server (or cluster) being monitored. A policy matching function 210 then compares the encoded representations to a set of such policy filters defined by the policy management layer to determine if the representations meet the criteria set by each of the configured policies. By using the above-described grammar, policies allow criteria to be defined via signatures (patterns) or anomalies. As will be seen, anomalies can be statistical in nature or deterministic. If either signatures or anomalies are triggered, the access is classified as an event; depending on the value of a policy-driven response field, an Audit 212 and/or an Alert 214 event is generated. Audit events 212 typically are stored within the appliance (in the storage layer 114), whereas Alert events 214 typically generate real-time alerts to be escalated to administrators. Preferably, these alerts cause the mitigation layer 116 to implement one of a suite of mitigation methods.

The third module 114 (called the storage layer) preferably comprises a multi-step process to store audit events into an embedded database on the appliance. To be able to store with high performance, the event information preferably is first written into memory-mapped file caches 115a-n. Preferably, these caches are organized in a given manner, e.g., one for each database table. Periodically, a separate cache import process 117 invokes a database utility to import the event information in batches into the database tables.

The fourth module 116 (called the risk mitigation layer) allows for flexible actions to be taken in the event alert events are generated in the analytics layer. As will be described in more detail below, among the actions preferably supported by this module are user interrogation and validation, user disconnection, and user de-provisioning, which actions may occur synchronously or asynchronously, or sequence or otherwise. In a first mitigation method, the layer provides for direct or indirect user interrogation and/or validation. This technique is particularly useful, for example, when users from suspicious locations initiate intrusions and validation can ascertain if they are legitimate. If an insider intrusion is positively verified, the system then can perform a user disconnect, such as a network-level connection termination. If additional protection is required, a further mitigation technique then "de-provisions" the user. This may include, for example, user deactivation via directories and authorization, and/or user de-provisioning via identity and access management. Thus, for example, if an insider intrusion is positively verified, the system can directly or indirectly modify the authorization information within centralized authorization databases or directly modify application authorization information to perform de-provisioning of user privileges. The mitigation layer may provide other responses as well including, without limitation, real-time forensics for escalation, alert management via external event management (SIM, SEM), event correlation, perimeter control changes (e.g., in firewalls, gateways, IPS, VPNs, and the like) and/or network routing changes.

Thus, for example, the mitigation layer may quarantine a given user whose data access is suspect (or if there is a breach) by any form of network re-routing, e.g, VLAN re-routing. Alternatively, the mitigation layer (or other device or system under its control) undertakes a real-time forensic evaluation that examines a history of relevant data accesses by the particular user whose actions triggered the alert. Forensic analysis is a method wherein a history of a user's relevant data accesses providing for root-cause of breach is made available for escalation and alert. This reduces investigation time, and forensic analysis may be used to facilitate which type of additional mitigation action (e.g., verification, disconnection, de-provisioning, some combination, and so forth) should be taken in the given circumstance.

As has already been described, the fifth module 118 (called the policy management layer) interacts with all the other layers. This layer allows administrators to specify auditing and theft rules, preferably via an English-like language. The language is used to define policy filters (and, in particular, given attack expressions) that capture insider intrusions in an expressive, succinct manner. The language is unique in the sense it can capture signatures as well as behavioral anomalies to enable the enterprise to monitor and catch "insider intrusions," "access intrusions," "disclosure violations," "illegitimate accesses" "identity thefts" and the like regardless of where and how the given information assets are being managed and stored within or across the enterprise.

Figure 3:
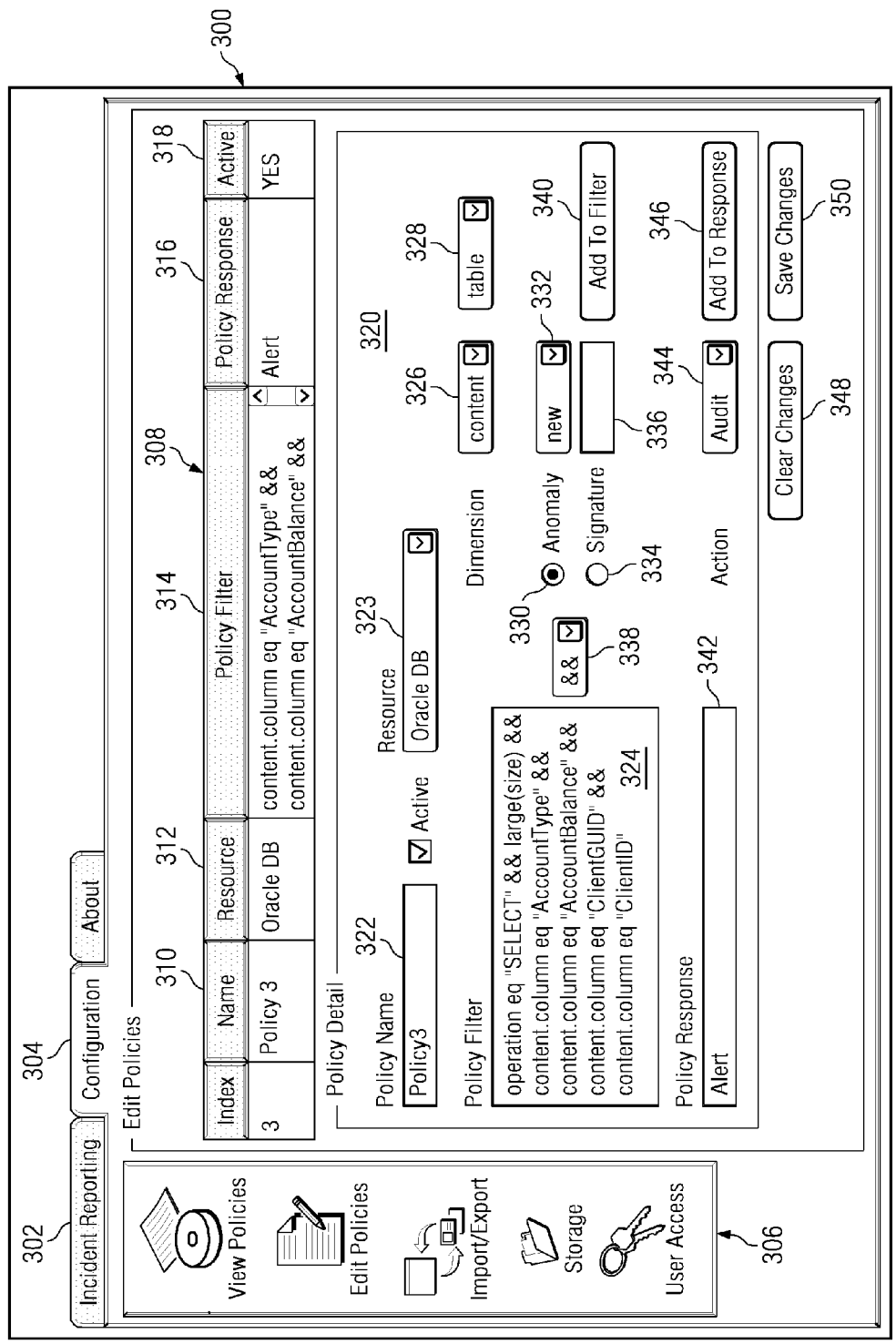
FIG. 3 illustrates a representative administrative interface for enabling the specification of a given insider attack as a policy using the invention policy specification language of the present invention.

FIG. 3 illustrates a representative user interface 300 that can be used to specify a given attack policy. This GUI is merely representative. In a representative embodiment, the GUI is exported for viewing on the network appliance 104 and/or a system management console (connectable to the appliance) is provided for this purpose. The particular location or machine from which the GUI is exposed to the administrator is not a limitation, as the GUI may be available locally or remotely. The GUI preferably includes an Incident Reporting tab 302 and a Configuration tab 304, which is illustrated. The Incident Reporting tab 302 catalogs, for example, the Audit events generated by the Monitoring layer. The Configuration tab 304 comprises a navigation bar 306 that enables the administrator to View Policies, Edit Policies, Import/Export Policies, access Storage and control User Access. The Edit Policies view is shown, as this is the menu that is used by an administrator to create and/or edit a policy. As used herein, a "policy" typically includes the policy name, metadata about the policy (e.g., name, resource protected, status, and the like), the policy filter itself, and a policy response. As seen in FIG. 3, the interface preferably includes a table 308 that displays the defined Policies indexed by number (with just one being shown). The table 308 includes fields such as a name field 310, a resource field 312, a policy filter field 314, a policy response field 316 and a field 318 indicating whether the policy is active. When a row in the table is selected, the Policy Detail is displayed in the body 320 of the menu and can be varied using conventional GUI interactivity and controls. Thus, the Policy Name can be changed by modifying the text in a fill-in field 322. The resource (e.g., a given enterprise data server, or a given enterprise data server type such as "Oracle DB") associated with the policy filter preferably is designated using a pull-down menu 323 or other such GUI control.

According to a desirable feature of the present invention, the administrator can create and/or modify a given Policy Filter in the field 324 using one or more GUI controls. Thus, for example, the administrator can specify a given dimension using the pull-down menu 326 and a given sub-dimension using the pull-down menu 328. By selecting the radio button 330 titled Anomaly, the administrator can select one of a set of behavior attributes from the pull-down menu 332. By selecting the radio button 334 titled Signature, the administrator and enter a given comparison operator in the fill-in field 336. An expression can then be created using the logical operators available from the pull-down menu 338 and the "Add To Filter" button 340. As the attack expression is developed, it is shown in the Policy Filter field 324. As also shown, the administrator can identify a response (in this case an Alert) in a Policy Response fill-in field 342 and specify the type of Action to take using the pull-down menu 344. An "Add To Response" button 346 is used to execute a change. Changes can be cleared or saved using the buttons 348 and 350.

Thus, the GUI in FIG. 3 implements the policy specification language to enable an administrator (or other authorized person or entity) to create a policy filter that is applied against a monitored data access to generate a given policy response. The policy language allows signatures of specific accesses to be defined via multiple dimensions such as Content, User, Operation, Location, Time, and Size. To be more efficient, the language also allows the Content dimension (for example) to refer to sub-dimensions such as "containers" or "patterns." As described above, "containers" typically refer to addresses where information assets are stored, whereas "patterns" refer to the actual assets themselves. The ability to monitor "containers" provides for higher throughput and better performance at lower cost.

Thus, in one example, content containers (specified as Content.container) refer to addresses where information assets are stored—such as a table/column containers in a database or file/folder containers in a file server. Content patterns refer to specific information strings that need to be monitored. By permitting use both these constructs to form a given Policy Filter, as noted above the policy language allows for efficient construction of compliance regulations for an enterprise with fewest possible rules. The policy language also allows the ability to specific behavioral anomalies, preferably via English-like anomaly constructs on different dimensions. Anomalies can be statistical or deterministic. As noted above, statistical anomalies may be specified via constructs like Large or New or Rare in conjunction with the dimension they operate on. For example, Large (Size) returns a success if the response size of a transaction is significantly larger than the past history. Deterministic anomalies may be specified by typical equality or inequality operators. For example, the operator size>X captures a deterministic anomaly in the event the response size exceeds threshold X.

Figure 4:
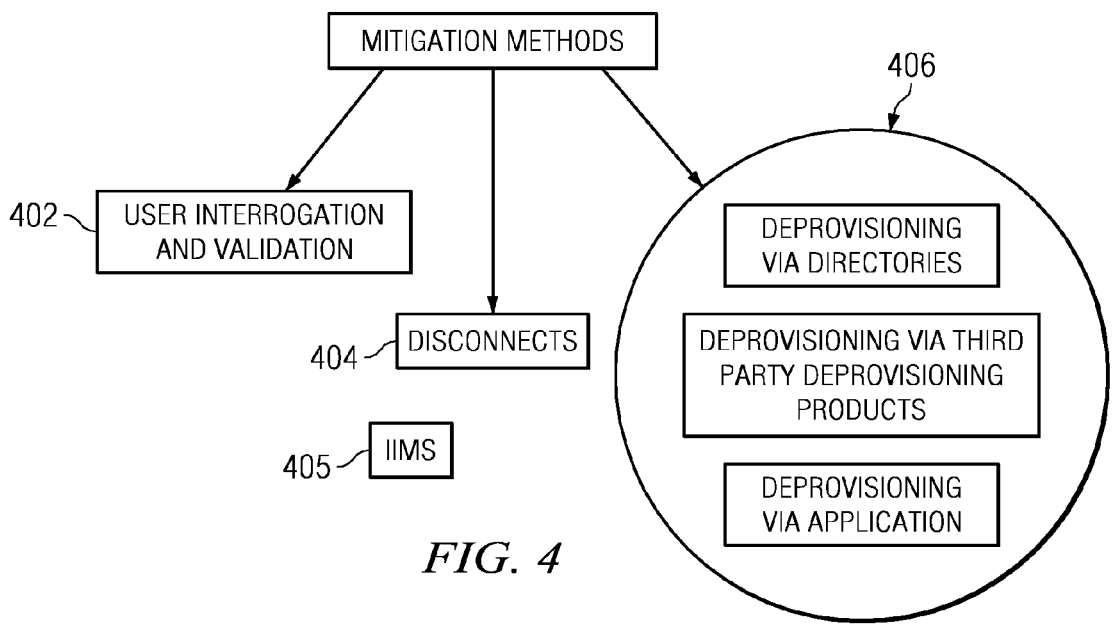
FIG. 4 illustrates a representative suite of mitigation techniques that may be implemented by an enterprise.

As noted above, the present invention provides for one or more mitigation methods as may be specified by an administrator in the GUI or otherwise. FIG. 4 illustrates a representative suite of mitigation techniques that may be implemented by an enterprise. As will be described, in one method, the mitigation layer implements direct or indirect means 402 to interrogate the user and perform an additional stage (or level) of validation (authentication) that the user access is legitimate. Interrogation has several benefits, especially in the case of masqueraders who have obtained the trusted user identity and hence authorized access to sensitive information. In such cases, interrogation can ask for an additional level of secret credentials (e.g., that are external to a conventional AAA infrastructure), which can distinguish between masqueraders and trusted users. According to the invention, interrogation can occur in real-time, or non real-time. In the former, if the user correctly authenticates in real-time, further access is permitted; otherwise other mitigation techniques such as Disconnects 404 or De-provisioning 406 are employed to terminate the user access. In the latter case, of course, interrogation has the effect of resolving an investigation.

The following paragraphs describe various methods to implement the interrogation function 402. For purposes of explanation, it is assumed that a given insider intrusion management server (IIMS) 405 is used to facilitate the interrogation, although this is not a requirement. The management server may comprise any hardware and/or software and/or be otherwise implemented as the Mitigation layer. The IIMS functionality may be implemented on a given appliance, across a set of appliances, or in any other convenient manner. Preferably, the function does not make any specific assumptions on the nature of "credentials" used to validate the user or the precise nature of authentication store used to implement the validation. The invention may use one of several mechanisms to query the user for additional credentials.

In a first approach, mitigation is performed through real-time interrogation, for example, via a native client. In this example, the IIMS (e.g., executing on a given appliance or a management console) preferably communicates with a software client product that resides on a user's host machine. In an alternative approach, mitigation is performed through real-time interrogation via messaging. In this case, the IIMS preferably communicates via a given message protocol to a message client instantiated on the user's host machine. The message may contain a challenge itself, or the message may contain a URL that directs the user to a web IIMS then requests and accepts additional credentials from the user, e.g., via an SSL connection from the user's client browser to the server. A third approach implements real-time interrogation via an application server. In a multi-tier web application server scenario, the IIMS communicates to the end user via an application server. Such communication is triggered preferably via signalling to the application server, which in return preferably uses web-based connections to demand additional credentials from the end-user. Yet another approach to interrogation is non real-time interrogation via email. In this scenario, the IIMS instantiates a mail client and communicates with the user via an email message that directs the user to a web server located on the IIMS itself The IIMS then requests and accepts additional credentials from the user via an SSL connection from the user's client browser to the IIMS server.

The above-described interrogation mechanisms will now be discussed in detail.

As noted above, the IIMS can achieve real-time interrogation via a native software client deployed on the user's machine. In this case, the IIMS challenges the user for additional authentication; based on the results of that challenge, the IIMS either allows the user to continue accessing corporate resources or the IIMS continues to deny access to said resources.

An illustrative procedure for subordinate authentication is as follows:

The IIMS determines that the user has violated corporate policies. The user is added to an internal list inside the IIMS. By default, every user on the list has all of their connection requests to corporate resources blocked via one of the blocking mechanisms specified above. The IIMS looks up the user's host IP address. This can be done by looking at the source IP address in a latest connection request by the user (as all addresses are cached) or optionally by accessing an LDAP/Active Directory corporate directory service and requesting the user's host from a corporate database. The IIMS then sends the client on the user's host a protocol message that instructs the client to query the user for username and extra credentials. The client software on the host challenges the user, and captures any response. The client software sends the username and credentials to the IIMS. The IIMS inspects (or supplies to an out-of-band validation module) the supplied username and credentials. If the credentials are sufficient, the user is removed from the IIMS internal to-be-blocked list, and preferably no further mitigation methods are invoked. The user can continue to access the data resources.

In the alternative, the IIMS can use instant messaging (or other such) software that may already exist on a user desktop to challenge the user for additional credentials in real-time.

One such process is detailed below:

The IIMS determines that the user has violated corporate policies. The user is added to an internal list inside the IIMS. Preferably, every user on the list has all of their connection requests to corporate resources blocked via one of the blocking mechanisms specified above. The IIMS looks up the user's instant messaging identity. This can be done, for example, via either configuration that includes all instant messaging identities for a corporation, or more practically, by accessing an LDAP/Active Directory corporate directory service and requesting the user's instant messaging identity from a corporate database. The IIMS sends the user an instant message. From this point, two distinct methods of continuing are available. The IIMS may either send to the user a challenge, requesting additional credentials, whereby the user simply enters his credentials as an instant message response to the IIMS; in the alternative, the IIMS sends a message containing the URL of a web server located on the IIMS. If the URL method is the chosen by the site administrator, the user receives the message and clicks on the URL, starting his or her browser, which navigates by default to the web server on the IIMS. Preferably, the URL also specifies a secure link, e.g., using the SSL protocol. The IIMS based web server then prompts the user for his username and additional credentials. The user enters his username and credentials. If the credentials are sufficient, the user is removed from the IIMS internal to-be-blocked list. The user then can continue to access data resources.

In a web-based multi-tier system, the IIMS can also use existing Web-based functionality to interrogate the user and obtain additional credentials for validation. One particular method to interface with the server is via modification of a file based on a web server. In general, the process requires that the web server check a control file on a volume mounted by both itself and the IIMS before performing any transaction. The file will normally have no entries in it; however during times of access violations to corporate resources, the file will contain entries that cause the web server to request additional credentials from a user accessing the corporate database via the web server. Any convenient file format will suffice.

The process referred to above is detailed below:

The IIMS determines that the user has violated corporate policies. The IIMS opens a special control file on a volume that is accessible by both the IIMS and the web server. Preferably, the name and directory path of the file have been pre-configured into the IIMS. The IIMS then adds the user's name to the file. Also included are the credentials against which the web server should challenge the user. These are optionally encrypted. Prior to performing any transaction, the web server checks the control file for entries indicating users to challenge. The web server receives a connection from a web client. It is assumed that the client is trying to access a form or data that is on the database. The web server checks the control file and finds the user of the client server session to be on the blocked list. The web server then posts a page to the client requesting additional credentials. The user enters his username and credentials. If the credentials are sufficient, the web server removes the blocked entry from the control file.

The following method is a multiple stage process whereby the user is securely challenged for additional credentials and authenticated. In general, the steps required are mailing a message via email to the user that is blocked, and then supplying the user with a URL through which he or she may access a web server instantiated on the IEMS. Through the web server on the IIMS, e.g., via a secure SSL tunnel, the user provides the necessary extra credentials that will allow him or her to regain access to corporate resources.

The process is detailed below:

The IIMS determines that the user has violated corporate policies. The user is added to an internal list inside the IIMS. Preferably, every user on the list has all of their connection requests to corporate resources blocked via one of the blocking mechanisms specified above. The IIMS looks up the user's email address. This can be done via either configuration that includes all email addresses for a corporation, or more practically, by accessing an LDAP/Active Directory corporate directory service and requesting the user's email address from a corporate database. The IIMS sends the user an email. Preferably, the email contains a URL that points the user back to a web server located on the IIMS. The user receives the email and selects the URL to open his or her browser to the web server on the IIMS. Preferably, the URL specifies a secure link using the SSL protocol. The IIMS based web server prompts the user for his username and additional credentials. This is the challenge. The user enters his username and credentials. If the credentials are sufficient, the user is removed from the IIMS internal to-be-blocked list. The user then can continue to access data resources.

As illustrated in FIG. 4, another form of mitigation that may be implemented according to the present invention is a so-called Disconnect 404. In general, the IIMS can implement a transient form of access denial known as TCP session termination. In one embodiment, session termination is invoked when the IIMS has determined that a user's behaviour has violated corporate policies. In particular, the IIMS issues a TCP reset (RST) packet to both the database client and server, effectively cutting the connection between the two hosts. In such case, both host stacks presume that the other side has initiated the reset, and neither will be harmed; yet the client will be unable to connect to and utilize the database. Subsequent attempts are met with the same IIMS action.

The following section describes the steps necessary for the IIMS to control user access to a corporate repository such as a database.

Figure 5:
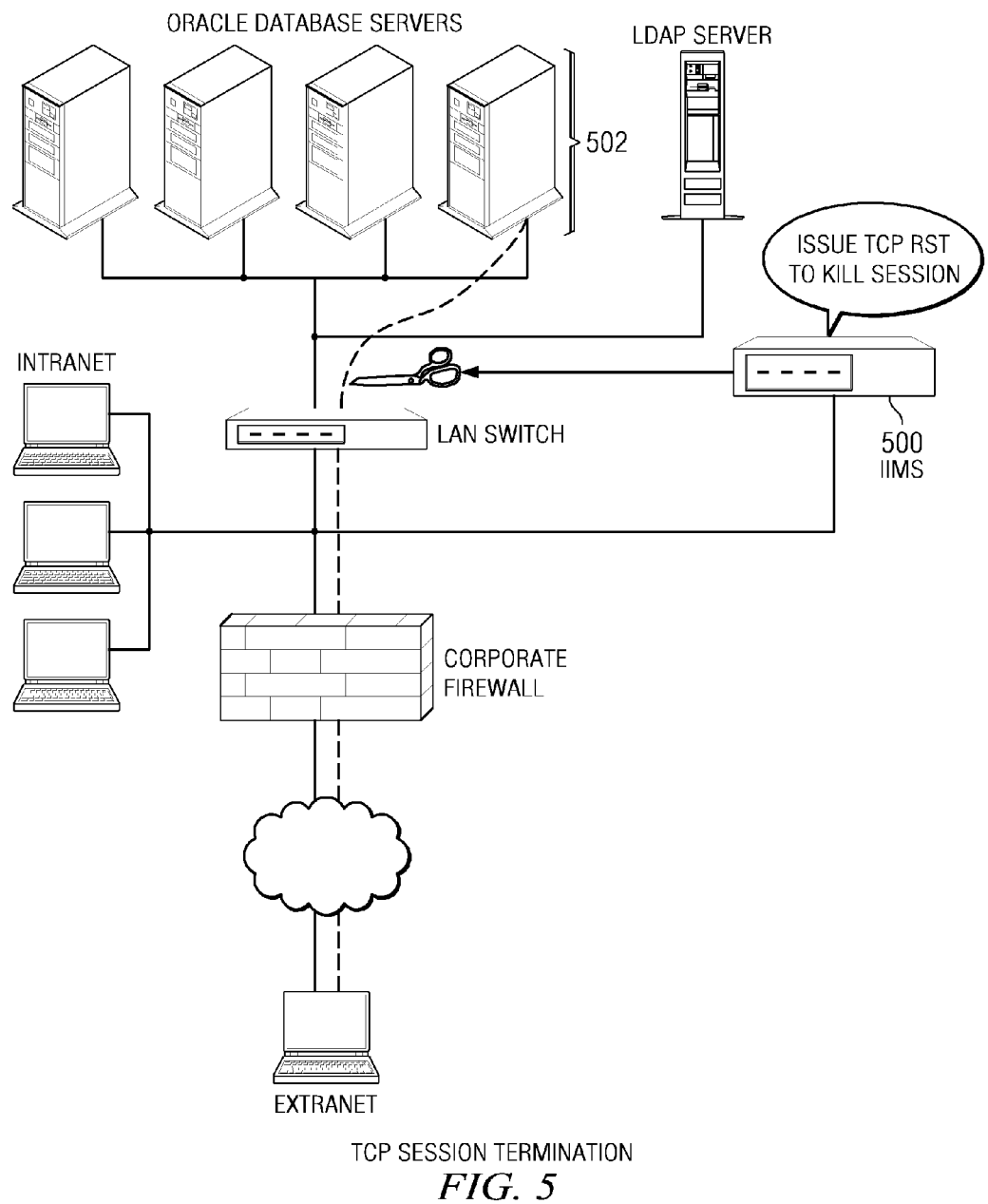
FIG. 5 illustrates a representative TCP session termination function that implements a Disconnect mitigation action according to the present invention.

It is assumed that the IIMS 500 is installed in a corporate network such as shown in FIG. 5. The IIMS is configured to terminate user network connections to corporate databases 502 if the user violates corporate policy. Optionally, the IIMS can be configured to terminate the client side or the server side or both sides of the connection. There are explicit advantages to both configurations. The IIMS 500 determines (through the Analytics layer) that a user has violated corporate policy and his actions are a threat to the well being of the company or its resources. This conclusion may be based on a completed transaction or a transaction that the user has just issued. For this example, the user is designated as USER. In such case, the USER is cached as a rogue user and any connections (including the current one) that USER initiates will be terminated. The IIMS 500 examines the transaction and determines the TCP level protocol information relevant to the session. Relevant details about the session include, for example: the client host address, the server host address, the server TCP sequence number, the client TCP sequence number, and the client SYN bit, if set in the last packet sent from client to server. In this example, the IIMS 500 issues TCP reset segments containing the noted prior detailed protocol information to the client and/or server. Which host is issued a TCP reset segment preferably depends on IIMS configured policy. In any case, the TCP stacks on the hosts participating in the session receive the reset segment and discontinue their participation in the session. All subsequent attempts to access the corporate database resources over the network preferably are met with the same actions from the IIMS. From this point on, until subsequent intervention the user (USER) preferably cannot access the database any further. While this technique is desirable, other techniques may be used to terminate the session without loss of generality.

As also described above, mitigation may involve user De-Provisioning 406 as illustrated in FIG. 4. Preferably, one or more different approaches are provided by the present invention to achieve de-provisioning of the user. Depending on the particular environment, one or more of these approaches may make sense. The three approaches are: de-provisioning via directory Stores (LDAP, Active Directory); de-provisioning via $3^{rd}$ Party de-provisioning products; and/or de-provisioning via application. In the following sub-sections, each of these methods is described in more detail.

By way of brief background, LDAP is both an information model and a protocol for querying and manipulating information stored according to the model. LDAP servers are commonly used as a central repository by medium to large enterprises for user information such as name, address, phone number, email address, and the like. This capability is called providing a directory service. Besides simple directory services, LDAP servers can be used as authentication stores, providing authentication and authorization information to be used by a multitude of applications running on various platforms. For example, as password information is stored securely, it becomes a trivial operation for an LDAP-aware client (such as a mail server) to compare the password entered by a user attempting access to the mail server against the value stored in the LDAP server. It is important to note that, like any mission database, LDAP servers can store any sort of information. The exact combination of attributes to be stored, the attribute types, and attribute names differ with installation—the attributes will be enterprise specific, even if they normally confer similar data regardless of the exact schema. It is also expected that exact requirements for each enterprise vary somewhat, for example, some installations may include an office phone number and a mobile phone number; others may include just an office number. Customary business practices today include removal of specific employee information upon termination or resignation from an enterprise. For example, once an employee resigns, he or she is removed from the company phone book. Additionally, application account privileges may be suspended for disciplinary or security reasons. For proprietary enterprise LDAP directories, this may be facilitated in several manners. Thus, for example, a given directory schema may include an attribute such as administrativeStatus, which logically communicates to applications whether a user is administratively active or whether his or her privileges are suspended. The IIMS thus must be able to program a given attribute to perform such activities, and preferably it also has a rudimentary understanding of the LDAP schema being used. Thus, for example, preferably IIMS knows how to modify an attribute(such as password) such that a user can no longer log on without administrative intervention—i.e. the administrator would be required to reset the attribute (i.e. password). This case is really a subset of the previous example, with the possibility that the value that is programmed into the LDAP attribute be randomized such that it is not guessable.

With Microsoft Active Directory, in contrast, the task is more straightforward. This is because Active Directory has a predefined schema that already includes well-known attributes that control and describe the user's status and ability to access resources. For example, Active Directory directories include the following attributes: UserAccountControl—this attribute controls whether a user's account is locked or not; LockoutTime—this attribute controls whether a user's account should be timed out for a certain period, and so forth. An Active Directory solution typically is built on top of LDAP. As noted above, an LDAP client can set the above attributes such that it can control the ability of a user to authenticate using LDAP.

As has been described, the IIMS knows when a user has behaved in a manner that is detrimental to the organization's resources and thus can act in a way that prevents the user from performing any other actions. It is assumed that IIMS can readily instantiate an LDAP client. Thus, it can perform any of the above actions to effectively suspend a user until such time as human involvement in the issue has occurred. For example, if an organization controls employment status and privileges via a directory element such as administrativeStatus, the IIMS can easily command the LDAP server to program the attribute to a value such as suspended or inactive, which signals to client applications (such as databases or mail servers) that the user is not in good standing and should not be permitted to use corporate resources. The IIMS can easily be programmed to send any LDAP command or set of commands; thus, the attribute(s) modified can be arbitrarily complex. Additionally, the IIMS can easily program Active Directory attributes in the same way.

Once the IIMS determines that a user's behavior constitutes an intrusion or a misuse of company resources, the IIMS modifies the entry that controls access for the user. In this regard, it is desirable for the IIMS to be flexible with regard to the attributes that it can program and values used to program. In particular, the IIMS may be installed in networks that authenticate using directories whose structure is not known a priori. Thus, for example, for directories without a logical "shutoff" or "user disable" knob, a possible method of disabling a user may be to simply change his or her password to a random value, thus requiring administrative interaction. The IIMS preferably is flexible enough to configure and stagger actions taken by severity of incident. For example, password reset may be an action taken only when the most severe transgression has happened, perhaps at a very unusual hour. Or, it may never be a chosen action. The organization can define these actions as it sees fit, of course.

Figure 6:
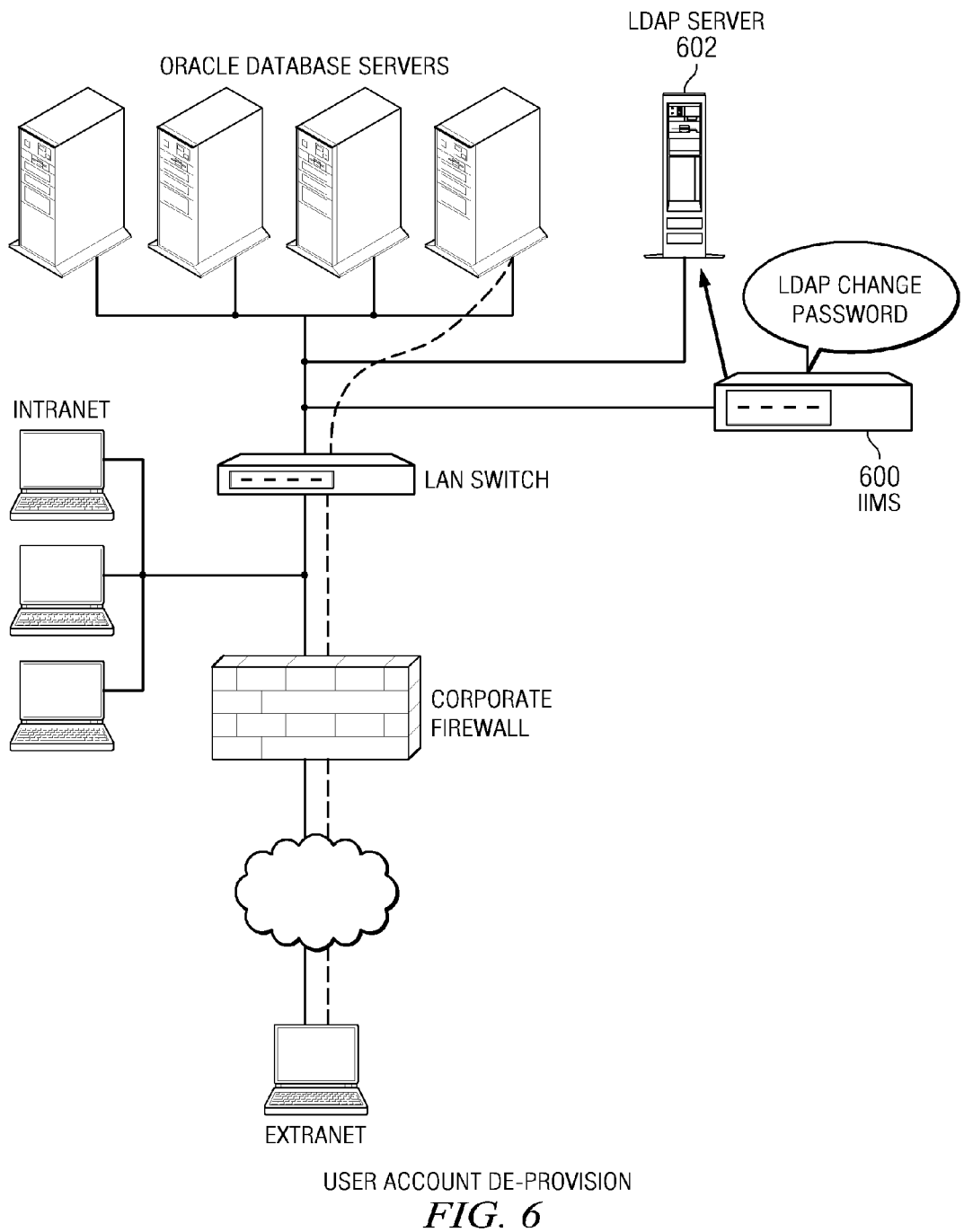
FIG. 6 illustrates how the IIMS can be used to de-provision user account attributes stored in an LDAP server based directory store.

The following section describes a specific method that the EIMS uses to de-provision user account attributes stored in an LDAP server based directory store. This process is illustrated in FIG. 6. In this embodiment, the IIMS 600 is installed in a corporate network that includes an LDAP server 602. Installation typically includes configuration of the system, including specifying parameters such as: (a) address of the local LDAP server 602 containing account information for users of a corporate resource such as a database; (b) summary schema information, such as directory hierarchy (e.g. the distinguished name (DN), which is the unique specification of where an attribute resides in an LDAP directory, the attribute type, the value which the attribute should be set to if the user is to be disabled, and the like) (This will be a string of information in a format similar if not equal to accountStatus, uid=USERNAME_TBD, ou=employees, dc=acme, dc=com); (c) the type of the attribute to be changed, for example accountStatus is an enumerated type with integer values for each status, e.g. 1=enabled, 2=disabled; and (d) the value to write into the accountStatus attribute. In this example the value would be '2', for disabled.

It is assumed now that the IIMS 600 determines that a user has violated corporate policy and his or her actions are a threat to the well-being of the company or its resources. The IIMS looks up the pre-configured Internet host address of the LDAP server 602 that contains account information for the user who is deemed to be a threat. In particular, the IIMS looks up the pre-configured DN string. The IIMS then replaces the USERNAME_TBD token in the DN string with the username string value of the user deemed to have been violating policy. The IHMS sends a message to the LDAP server that contains the entire DN string, preferably now customized to include the rogue username. The message is an LDAP ModifyRequest protocol message. The message preferably includes the following parameters: (a) type of operation, which is an LDAP modification request, of operation type replace. This means that whatever value is currently instantiated by the attribute will be replaced by the value being sent by the IIMS; the DN of the object being modified, which is the entire string created above; the type of the object being replaced; and, the values being written. In the current example, this means the type of the accountStatus attribute. The LDAP server responds to the IIMS preferably with a ModifyResponse message. The modify response message lets the IIMS know that the operation was successful or that it failed. If for any reason the operation was a failure, the IIMS preferably issues alerts to any configured machine or device warning message recipients.

The steps necessary for the IIMS to de-provision user account attributes stored in an Active Directory (AD) server based directory store are similar but simply take into consideration the differences in attributes. Thus, in an Active Directory implementation, the IIMS is installed and configured with parameters such as the address of a local Active Directory server containing account information for users of a corporate resource such as a database, the name of an attribute object that the IIMS should rewrite (e.g., a userAccountControl), the DN that prepends the account control attribute, and the value that should be written into the attribute. Once the IIMS determines that a user has violated corporate policy, it looks up the pre-configured Internet host address of the Active Directory server, looks-up the pre-configured DN string, replaces given tokens in the DN string with the username string value of the user, and sends a message to the server that contains the entire DN string customized to include the rogue username. Just as in the LDAP scenario, the Active Directory server responds with an LDAP ModifyResponse message. The modify response message lets the IIMS know that the operation was successful or that it failed. If for any reason the operation was a failure, the IIMS preferably issues alerts to any configured machine or device warning message recipients.

Some enterprise networks may use a form of proxy for access to authentication information. This software proxy affords a consistent application programming interface (API) to any number of backend directory stores. The IIMS can interoperate with such third party de-provisioning products as well. The process is similar to that described above with respect to either the LDAP or Active Directory approaches. In particular, preferably the IIMS includes a protocol stub that communicates via a proprietary protocol to the third party server, which in turn communicates to any and all directory stores that are connected to the third party server. The IIMS communicates the necessary instructions as it were an LDAP client. The above procedure can by analogy be extended for any other provisioning products or services. Thus, for example, the IIMS can provide a permanent or semi-permanent form of de-provisioning using the database itself. In particular, when the IIMS senses that a user has violated corporate policies, it immediately logs into the database and takes a layered approach to access denial. If the violation is serious enough, configured IIMS policy may dictate that the user's password is modified, thus blocking the user from any subsequent access to the database. If the violation is less severe, the IIMS logs on to the database and issues SQL commands that revoke the user's ability to read and or write to the tables accessed in violation of corporate policy.

Thus, de-provisioning according to the present invention may also involve control of application access or application authorization. Database table permission control is one type of application access, although the present invention is not limited to this approach.

The following describes how IIMS may be used to implement application access control de-provisioning. The IIMS is installed in a corporate network. The IIMS determines that a user has violated corporate policy and/or that his or her actions are a threat. This determination can be made based on a completed transaction or a transaction that the user has just issued, as described by the Policy Management layer. For this example, the user is deemed USER. In operation, the IIMS parses the transaction and retrieves the table name from the transaction. For example, assume the table name is finances. The IIMS logs on to the database as a privileged user (i.e. SUPERUSER/SYS/DBA) and issues the following SQL commands: revoke alter on finances from USER, revoke create on finances from USER, revoke delete on finances from USER, and so forth. The database server responds to the IIMS with a response message. The response message lets the IIMS know that the transaction was successful or failed. If for any reason the operation was a failure, the IEMS immediately issues alerts to any configured warning message recipients. From this point, until subsequent intervention, the user (USER) cannot access the table any further. Optionally, if the violation is serious enough, the IIMS can revoke the user's ability to access any tables in the database.

A similar technique can be used by IIMS to implement application authorization control. The IIMS is installed in a corporate network. The IIMS determines that a user has violated corporate policy and/or that his or her actions are a threat. This determination can be made based on a completed transaction or a transaction that the user has just issued, as described by the Policy Management layer. For this example, the user is deemed USER. In operation, the IIMS examines the transaction and identifies the database the USER was accessing. For example, assume the database is CustomerDB. The IIMS logs on to the database as a privileged user (i.e. SUPERUSER/SYS/DBA) and issues the following SQL command: revoke connect on CustomerDB from USER. The database server responds to the IIMS with a response message. The response message lets the IUMS know that the transaction was successful or failed. If for any reason the operation was a failure, the IIMS immediately issues alerts to any configured warning message recipients. From this point, until subsequent intervention, the user (USER) cannot access the database any further.

As has also been described, the present invention proposes the use of "actions" to denote appropriate response to an insider intrusion. A typical action might be "Alert" at a particular severity level. Another might be "disconnect" to convey that the connection carrying insider intrusion should be disconnected to prevent further damage from the intrusion. Yet another action de-provisions the user. All of these techniques have been described in detail above.

As noted above, a desirable feature of the present invention is the ability to specify given policies that can be enforced with respect to given enterprise data servers. Using these policies, the management layer can monitor given information assets in those data sources and generate audits on select events and/or alerts with respect to given anomalous behavior. Both the monitoring and analytics layers are driven by the policy specification language in the sense that these layers understand and are based on the language. As noted above, these layers also understand the semantics of the underlying, yet often different underlying data access protocols.

Variants

While the present invention has been described in the context of one or more representative embodiments, this is not a limitation of the invention.

The functions of the particular layers described above may be implemented in any given system, device, program or process.

It is not required that an enterprise use IIPL to generate Policy Filters. An enterprise may simply implement a given IIMS (or some function thereof) against a predefined set of Policy Filters as opposed to creating them using the GUI.

As has been described, the IIMS may be implemented with only one type of mitigation method as opposed to the multiple techniques described above. If multiple techniques are used, they need not be implemented in any given sequence. Two or more mitigation techniques may be carried out concurrently. A given mitigation technique may be used for one user while a second technique used for another, even when the access patterns are similar. A given mitigation technique may be implemented in ways other than as described above.

The IIPL functionality may be implemented separate and apart from the IIMS functionality, of course.

A given appliance that implements the present invention may be operated in other than promiscuous mode. In particular, the monitoring layer (or other discrete functionality in the appliance) can be provided to receive and process external data feeds (such as a log of prior access activity) in addition to (or in lieu of) promiscuous or other live traffic monitoring A given function in the appliance may be implemented across multiple such appliances, or under the control of a management console.

The GUI illustrated in FIG. 3 may be modified in any convenient manner. The functions may be specified using other known techniques, such as a command line interface.

More generally, although the present invention has been described in the context of a method or process, the present invention also relates to apparatus for performing the operations herein. As described above, this apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including an optical disk, a CD-ROM, a magnetic-optical disk, a read-only memory (ROM), a random access memory (RAM), a magnetic or optical card, or any type of media suitable for storing electronic instructions, and each coupled to a computer system bus.

While the above written description also describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Using IIMS, the present invention provides a suite of mitigation methods that alone or in combination provide powerful insider intrusion prevention. These methods include, by way of example only: user interrogation, user disconnect, and user privilege de-provisioning. In the first method, the system provides for direct or indirect user interrogation and/or validation. This technique is particularly useful, for example, when users from suspicious locations initiate intrusions and validation can ascertain if they are legitimate. If an insider intrusion is positively verified, IIMS can perform a user disconnect, such as a network-level connection termination. One particular method of the user disconnect implementation involves network level TCP session termination, which causes the session to be dropped by the client or server, or both. Another mitigation technique "de-provisions" the user. Thus, for example, if an insider intrusion is positively verified, IIMS can directly or indirectly modify the authorization information within centralized authorization databases or directly modify application authorization information to perform de-provisioning of user privileges. As described above, de-provisioning of user privileges may be local (i.e., affecting only the system under attack), or it may have a global scope beyond that of the immediate application, thus preventing the intruding user from accessing corporate resources until, for example, administrative intervention has occurred.

The present invention is capable of monitoring even the largest data center, without interrupting the flow of information to users. It not only recognizes the behavioral changes that signal danger to an enterprise's critical data assets, but it also creates a comprehensive audit trail that will satisfy even the strictest privacy and compliance regulations. The present invention is easy to deploy and use, scalable, affordable and it meets the needs of any organization with critical data to protect.

The invention claimed is:

1. A machine-implemented method of protecting an enterprise information asset against insider attack, comprising:

specifying an insider attack policy filter that defines (a) a given action that a trusted user may attempt to take with respect to a given enterprise information asset stored on a given enterprise data server, and (b) a given risk mitigation response that is to be performed upon detection of the given action, wherein the policy filter is based on a policy specification language;

monitoring a trusted user's given data access with respect to the given enterprise data server;

analyzing the given data access against the policy filter;

determining whether the trusted user's given data access is indicative of the given action as specified by the policy filter;

if the trusted user's given data access is indicative of the given action as specified in the policy filter, performing the given mitigation response as specified in the policy filter.

2. The machine-implemented method as described in claim 1 wherein the given mitigation response interrogates the trusted user for at least one additional credential.

3. The machine-implemented method as described in claim 2 wherein the trusted user is interrogated directly and in real-time.

4. The machine-implemented method as described in claim 2 wherein the trusted user is interrogated indirectly and in real-time.

5. The machine-implemented method as described in claim 2 wherein the trusted user is interrogated indirectly and in other than real-time.

6. The machine-implemented method as described in claim 1 wherein the given mitigation response disconnects the trusted user from the enterprise data server.

7. The machine-implemented method as described in claim 1 wherein the given mitigation response de-provisions the trusted user from a given enterprise resource that otherwise enables the trusted user to obtain access to the enterprise information asset.

8. The machine-implemented method as described in claim 7 wherein the given enterprise resource is a directory.

9. The machine-implemented method as described in claim 1 wherein the given mitigation response initiates a forensic evaluation of prior data accesses of the trusted user.

10. The machine-implemented method as described in claim 1 wherein the forensic evaluation is performed to facilitate determination of a given mitigation response.

11. The machine-implemented method as described in claim 1 wherein the given mitigation response quarantines the trusted user.

12. The machine-implemented method as described in claim 11 wherein the trusted user is quarantined by network re-routing.

* * * * *